United States Patent
Koning et al.

(10) Patent No.: US 11,222,427 B2
(45) Date of Patent: Jan. 11, 2022

(54) IMAGE COMPRESSION

(71) Applicant: Wind River Systems, Inc., Alameda, CA (US)

(72) Inventors: Maarten Koning, Bloomfield, CA (US); Mihai Dragusu, Galati (RO)

(73) Assignee: Wind River Systems, Inc., Alameda, CA (US)

( * ) Notice: Subject to any disclaimer, the term of this patent is extended or adjusted under 35 U.S.C. 154(b) by 73 days.

(21) Appl. No.: 16/176,975

(22) Filed: Oct. 31, 2018

(65) Prior Publication Data

US 2020/0134835 A1   Apr. 30, 2020

(51) Int. Cl.
| | | |
|---|---|---|
| *G06T 7/194* | (2017.01) | |
| *G06K 9/34* | (2006.01) | |
| *G06F 17/18* | (2006.01) | |
| *G06T 3/00* | (2006.01) | |
| *G06F 16/58* | (2019.01) | |
| *G06F 16/583* | (2019.01) | |

(52) U.S. Cl.
CPC .............. *G06T 7/194* (2017.01); *G06F 16/58* (2019.01); *G06F 16/5838* (2019.01); *G06F 17/18* (2013.01); *G06K 9/342* (2013.01); *G06T 3/0093* (2013.01)

(58) Field of Classification Search
CPC ... G06T 7/194; G06T 3/0093; G06F 16/5838; G06F 16/58; G06F 17/18; G06K 9/342
See application file for complete search history.

(56) References Cited

U.S. PATENT DOCUMENTS

| | | | | |
|---|---|---|---|---|
| 10,289,446 | B1* | 5/2019 | Karppanen | G06F 9/4831 |
| 10,365,798 | B1* | 7/2019 | El Kaissi | G06F 3/0484 |
| 2007/0064974 | A1* | 3/2007 | Ayachitula | G06F 16/786 382/103 |
| 2010/0201780 | A1* | 8/2010 | Bennett | H04N 7/15 348/14.12 |
| 2011/0025735 | A1* | 2/2011 | Nohilly | B41J 3/407 347/2 |
| 2011/0164109 | A1* | 7/2011 | Baldridge | H04N 13/257 348/43 |

(Continued)

OTHER PUBLICATIONS

Google Scholar Search results.*

*Primary Examiner* — Qun Shen
(74) *Attorney, Agent, or Firm* — Fay Kaplun & Marcin, LLP (57) ABSTRACT

A device, system, and method performs an image compression. The method includes receiving raw image data of an image and identifying objects in the image as one of a foreground object or a background object. The method includes generating first foreground image data for a first foreground object. The method includes generating first metadata for a first background object. The first metadata indicates a first identity and a first descriptive parameter for the first background object. The first descriptive parameter relates to how the first background object is situated in the image. The method includes generating first background image data for the first background object. The first background image data is empty data. The method includes storing processed image data for the image comprising the first foreground image data, the first metadata, and the first background image data.

20 Claims, 5 Drawing Sheets

(56) References Cited

U.S. PATENT DOCUMENTS

| | | | |
|---|---|---|---|
| 2013/0170760 A1* | 7/2013 | Wang | G06K 9/00711 |
| | | | 382/224 |
| 2014/0188514 A1* | 7/2014 | Balignasay | G16H 30/20 |
| | | | 705/3 |
| 2014/0351408 A1* | 11/2014 | Anderson | H04L 41/5074 |
| | | | 709/224 |
| 2015/0169992 A1* | 6/2015 | Ioffe | G06K 9/46 |
| | | | 382/218 |
| 2016/0205341 A1* | 7/2016 | Hollander | H04N 7/015 |
| | | | 375/240.08 |
| 2017/0343809 A1* | 11/2017 | Benesh | G02B 27/017 |
| 2017/0358059 A1* | 12/2017 | Zhang | G06T 7/194 |
| 2018/0174299 A1* | 6/2018 | Agrawal | G06T 7/90 |
| 2020/0051323 A1* | 2/2020 | Araki | G06T 7/55 |

* cited by examiner

IMAGE COMPRESSION

BACKGROUND INFORMATION

An image may be captured using a variety of different capturing devices with various parameters. With improvements to image capturing devices and a corresponding quality at which images may be captured, an increased amount of data may be required to be associated with creating and/or storing this high quality image. For example, a size of the image that is stored may increase with a greater density of pixels for the quality to be shown. Accordingly, a resulting image file that is created may require further amounts of data.

The image may also include various objects or areas that have little to no significance relative to other areas of the image. Yet, these low significance areas and objects are also captured with the same quality as the more significant areas and objects. Therefore, when the image is to be shown, the image may be recreated in the same way that the image was captured. Even with compression techniques, the high quality image may still require a relatively large amount of data. In exchange for greater quality in a captured image including the areas and objects having low significance, storage requirements increase that may negatively impact a user experience in maintaining a library of images or transmitting images to others over various network connections.

SUMMARY

The exemplary embodiments are directed to a method for image compression at a compression server. The method comprises receiving raw image data of an image and identifying objects in the image as one of a foreground object or a background object. The method comprises generating first foreground image data for a first foreground object. The method comprises generating first metadata for a first background object. The first metadata indicates a first identity and a first descriptive parameter for the first background object. The first descriptive parameter relates to how the first background object is situated in the image. The method comprises generating first background image data for the first background object. The first background image data is empty data. The method comprises storing processed image data for the image comprising the first foreground image data, the first metadata, and the first background image data.

The exemplary embodiments are directed to a compression server comprising a transceiver and a processor for image compression. The transceiver is configured to receive a raw image data of an image. The processor is configured to identify objects in the image as one of a foreground object or a background object. The processor is configured to generate first foreground image data for a first foreground object. The processor is configured to generate first metadata for a first background object. The first metadata indicates a first identity and a first descriptive parameter for the first background object. The first descriptive parameter relates to how the first background object is situated in the image. The processor is configured to generate first background image data for the first background object. The first background image data is empty data. Processed image data for the image is configured to be stored by comprising the first foreground image data, the first metadata, and the first background image data.

The exemplary embodiments are directed to a method for image compression at a compression server. The method comprises receiving a request to recreate an image based on processed image data. The processed image data includes foreground image data, metadata, and background image data. The foreground image data corresponds to at least one identified foreground object. The metadata indicates a respective identity for at least one identified background object. The metadata further indicates a descriptive parameter for each of the at least one identified background object. The descriptive parameter relates to how each of the at least one background object is situated in the image. The background image data is empty data. The method comprises recreating each foreground object using the foreground object data, each background object using the metadata, and recreating the image.

DETAILED DESCRIPTION

The exemplary embodiments may be further understood with reference to the following description and the related appended drawings, wherein like elements are provided with the same reference numerals. The exemplary embodiments are related to a device, a system, and a method for improving compression of image data by leveraging image-processing techniques to identify foreground content and background content in an image. Specifically, by identifying the different types of content, the exemplary embodiments may select the manner in which the corresponding areas of the image are to be stored. The manner of storage may be to retain the foreground content with a captured quality. The background content that is included in the image may be identified with corresponding information included in metadata and parameterized. Thus, the image data may include foreground data corresponding to the foreground content and the metadata for the background content. Subsequently, in recreating the image, the foreground content may be recreated with standard techniques using the foreground data of the image data and the background content of the image may be approximated as indicated in the metadata of the image data.

Initially, it is noted that the exemplary embodiments are described herein with regard to capturing an image and image processing. However, the use of an image and image related operations is only exemplary. The exemplary embodiments may be utilized for any data captured by a sensor including a capturing component where first information is stored as captured while metadata is generated for second information such that the first information and the metadata may be used in recreating the captured data.

It is also noted that the exemplary embodiments may be implemented in various image processing devices or systems. As those skilled in the art will understand, there are various ways of processing image data that is being captured by a sensor. In one manner, the sensor may capture an image which is processed by the sensor. Thus, the sensor may generate image data and create, for example, an image file corresponding to the image data that is stored (e.g., in a memory of the sensor or in a remote storage device). In another manner, the sensor may be configured to capture the image where raw data of the image is provided to a receiver where the sensor and receiver are separate units. The receiver may forward the raw data to a processing unit or itself perform processing operations on the image data to create the image file. The exemplary embodiments may be implemented in any of these image processing configurations. For illustrative purposes, the exemplary embodiments are described with regard to the sensor providing raw data to a receiver (e.g., a compression server). However, those skilled in the art will understand that a bandwidth requirement may be decreased if the sensor is configured to process the raw data according to the exemplary embodiments prior to transmission to the receiver.

The exemplary embodiments provide a mechanism that compresses image data by storing information relating to an image using first information for foreground content that retains a quality of this content as captured and second information for background content to enable approximation when the image is to be recreated. In utilizing this image compression technique according to the exemplary embodiments, an image may retain a general utility and value at a fraction of image data generated with conventional image compression operations. As will be described in further detail below, the background content may be stored as information in metadata so that the actual background content as captured is not stored as part of the image data. Instead, when recreating the image, the metadata allows a compression server to retrieve information from one or more sources that allow the background content to be approximated and reproduced in the image. As a result, the image data generated by the exemplary embodiments may enable improvements to storage requirements, processing efficiency, and transmission efficiency.

Figure 1:
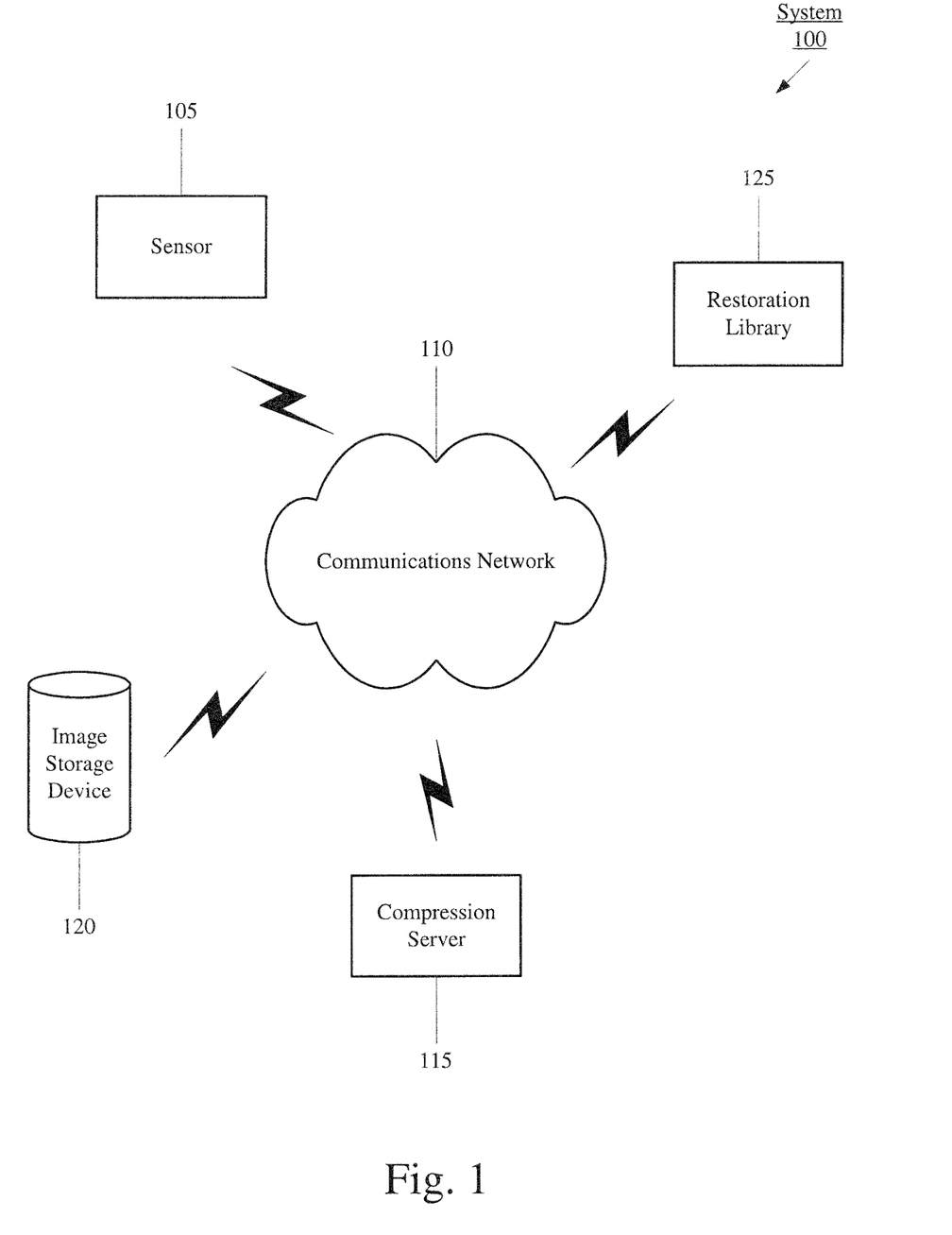
FIG. 1 shows an exemplary system to process images according to various exemplary embodiments described herein.

FIG. 1 shows an exemplary system 100 to process images according to various exemplary embodiments described herein. The system 100 relates to a communication between various components involved in storage and retrieval of images. In a first aspect, the system 100 may process raw data of a captured image to generate image data. In a second aspect, the system 100 may recreate the image based on the image data. The system 100 may include a sensor 105, a communications network 110, a compression server 115, and an image storage device 120.

The sensor 105 may be part of an image processing arrangement in which data captured by the sensor 105 is transmitted to the compression server 115. The sensor 105 may represent any combination of hardware, software, and/or firmware used to capture an image or sequence of images as raw data. For example, the sensor 105 may be the capturing device of a still image camera, a video camera, etc. including a lens, an aperture, a shutter release, etc. The sensor 105 may be implemented as a network component (e.g., an end device) or part of a short-range device to device connection. For illustrative purposes, the exemplary embodiments are described with regard to the sensor 105 being a network component.

The communications network 110 may be configured to communicatively connect the various components of the system 100 to exchange data. The communications network 110 may represent any single or plurality of networks used by the components of the system 100 to communicate with one another. For example, if the sensor 105 is used wirelessly, the communications network 110 may be connected to the Internet. Thus, the sensor 105 may be communicatively connected to the compression server 115. It should be noted that the communications network 110 and all networks that may be included therein may be any type of network. For example, the communications network 110 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc.

The compression server 115 may be a component of the system 100 that performs functionalities associated with processing raw data to generate image data according to the exemplary embodiments. As will be described in further detail below, the compression server 115 may include a first mechanism in which the raw data is analyzed to determine foreground content and background content as well as generate foreground data for the foreground content and metadata for the background content to be included in the image data. The compression server 115 may also include a second mechanism in which an image is recreated based on the image data by generating the foreground content using the foreground data and generating the background content using approximation operations based on information included in the metadata.

The system 100 may also include the image storage device 120 that stores the image data for each image. The image storage device 120 may represent any storage unit in which data may be stored. As illustrated, the image storage device 120 may be a remote unit that enables data exchange with the components of the system 100 using the communications network 110. However, the image storage device 120 being a network component is only exemplary. According to another exemplary embodiment, the image storage device 120 may also be incorporated in one of the components of the system 100 such as the sensor 105, the compression server 115, etc.

It is noted that the system 100 may include a plurality of sensors 105, a plurality of compression servers 115, and a plurality of image storage devices 120. That is, many different sources of raw data (e.g., the sensor 105) may utilize or be associated with the system 100 for respective image data to be generated and stored. There may also be many different compression servers 115 that service different sensors 105. For example, the compression server 115 may be linked to a geographical region or a particular user.

Figure 2:
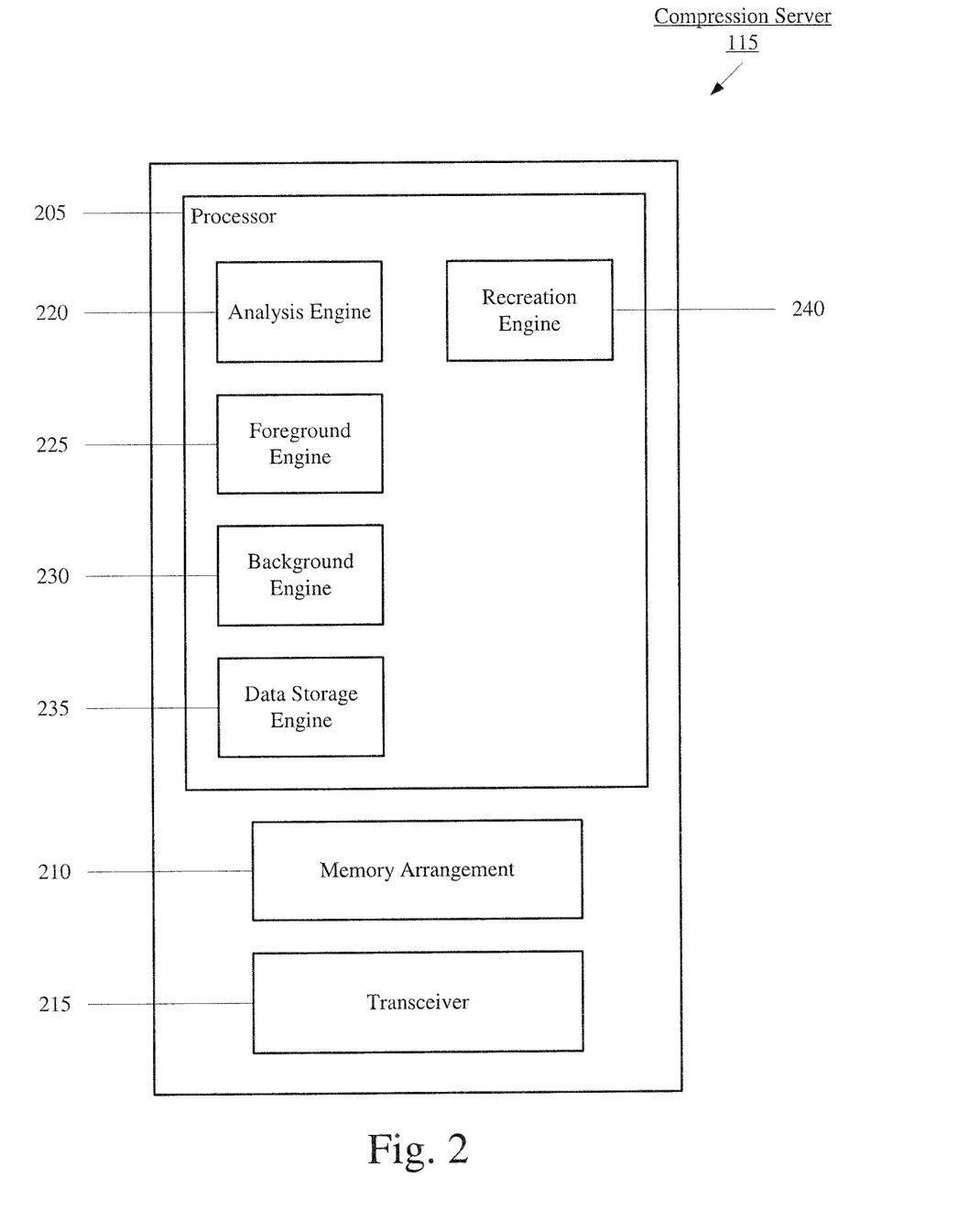
FIG. 2 shows an exemplary compression server of the system of FIG. 1 according to various exemplary embodiments described herein.

As described above, the compression server 115 may provide a first mechanism related to generating and storing image data as well as a second mechanism related to recreating an image based on the image data and other sources. FIG. 2 shows an exemplary compression server 115 of the system of FIG. 1 according to various exemplary embodiments described herein. The compression server 115 may be part of an image processing arrangement in which raw data captured by the sensor 105 is received. The compression server 115 may represent any combination of hardware, software, and/or firmware used to generate image data. The compression server 115 may include a processor 205, a memory 210, and a transceiver 215. The compression server 115 may further include one or more of the following: a display device, an input/output (I/O) device, and other suitable components, such as, for example, a power supply, an audio I/O device, a data acquisition device, ports to electrically connect the compression server 115 to other electronic devices, etc.

The processor 205 may be configured to execute computer-executable instructions for operations from a plurality of engines that provide various functionalities of the compression server 115. For example, the engines of the compression server 115 may provide the features of the first mechanism according to the exemplary embodiments in which raw data from the sensor 105 is processed to generate image data. In providing this feature, the compression server 115 may include an analysis engine 120, a foreground engine 225, a background engine 230, and a data storage engine 235. The analysis engine 220 may be configured to analyze the raw data of an image to identify foreground content and background content. The foreground engine 225 may be configured to generate foreground data for the foreground content which is to be included in image data for the image corresponding to the raw data. The background engine 230 may be configured to generate metadata representative of the background content which is to be included in the image data for the image corresponding to the raw data. The data storage engine 235 may be configured to generate the image data in a proper format to be stored in the image storage device 120.

It should be noted that the above noted engines each being an application (e.g., a program) executed by the processor 205 is only exemplary. The functionality associated with the engines may also be represented as a separate incorporated component of the compression server 115 or may be a modular component coupled to the compression server 115, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof.

The memory 210 may be a hardware component configured to store data related to the functionalities performed by the compression server 115. For example, the memory 210 may store raw data received from the sensor 105. In another example, the memory 210 may be the image storage device 120 when incorporated in the compression server 115. The transceiver 215 may provide conventional functionalities in establishing a connection to the communications network 110. For example, as described above, the transceiver 115 may enable a connection or a communication to be established with the sensor 105 using a network connection or a short-range connection.

It is again noted that the exemplary embodiments are described herein with regard to a network configuration in which the communications networks 110 serves as a pathway for the various components in the system 100 to exchange data. However, the use of the network is only exemplary. In a first example, the exemplary embodiments may also use direct connections without the communications network 110. In a second example, the exemplary embodiments may be incorporated into a single device such as the sensor 105. In a third example, the exemplary embodiments may utilize different arrangements where select ones of the functionalities of the compression server 115 may be distributed to other components. For example, the functionality of the analysis engine 220, the foreground engine 225, and the background engine 230 may be incorporated in the sensor 105. Accordingly, the processed raw data may be communicated to the compression server 115. As will be described in detail below, the processed raw data and the resulting image data may utilize a substantially smaller amount of data than processed raw data using conventional image processing techniques. Thus, the exemplary embodiments may also reduce bandwidth requirements for the arrangement of the system 100 in which the sensor 105 transmits data to the compression server 115.

In performing the first mechanism to generate the image data including the foreground data and the metadata, the exemplary embodiments recognize that portions of an image may not be of interest to a user who views the image. For example, the portions of little to no interest may be a low significance portion. Accordingly, the exemplary embodiments may essentially remove these low significance portions from an image for storage purposes. For example, in a static image for a security implementation, only the person (e.g., face, body, etc.) and identifying features of the person (e.g., tattoos, scars, etc.) are of interested in the image. Accordingly, only the person may be recorded since the background may be known or of no interest. If the camera location and direction to the person is known, the background content for such an image may be parameterized and generated rather than recorded. For example, if the background is of the sky or a wall, this background may be regenerated based on accessible information, as will be described in further detail below. By not recording the background in the same manner as the foreground with a detailed capture and conversion to image data, the background may be stored in a representative manner with specifics for a recreation to be approximated or regenerated in a substantially accurate manner.

It is noted that the terms "foreground" and "background" are used to describe how objects in an image are labeled. That is, foreground content does not necessitate an object that is in front of other objects and background content does not necessitate an object that is behind other objects. According to the exemplary embodiments, foreground content may relate to any one or more objects that have a relatively high significance (e.g., above a significance threshold) while background content may relate to any one or more objects that have a relatively low significance (e.g., below the significance threshold). For example, foreground content may include a person on which the captured image is focused while non-human objects may be considered background content. In fact, foreground content and background content may be individual objects of a common, overall whole object. For example, a person may be captured in an image where the person's shoulders and head with face are included and the person is wearing a generic, colored shirt. As such, the head with face may be considered foreground content while the body including the shoulders (and remaining objects) may be considered background content. As will be described in further detail below, each object that is identified (even component objects of a whole) may be categorized as foreground content or background content for subsequent processing.

As noted above, the analysis engine 220 may analyze the raw data of an image to identify foreground content and background content. For example, the raw data that represents the image may be used to identify portions in the raw data that correspond to various objects included in the image. Depending on various factors associated with capturing an image, the analysis engine 220 may identify the various objects in the image. As noted above, the objects may be individual objects as a whole or as component parts of an overall object. The analysis engine 220 may utilize any mechanism in which to identify an object in an image (e.g., facial recognition operation to identify a face and head of a person, a geographic pattern recognition operation to identify a location that the image was captured to subsequently identify known objects at the location, etc.).

Once the analysis engine 220 has identified the objects in the image, the analysis engine 220 may determine a relative significance of each object in the image. The significance may be determined based on a set of predetermined rules that consider the objects in the image in an individual manner and/or a holistic manner. For example, in an individual capacity, a person may have a base significance that is greater than a base significance of an inanimate object (e.g., a building) or a natural object (e.g., a tree). In another example, in a holistic capacity, a person alone in a natural scene may have a base significance that is greater than a base significance of an individual person among a plurality of people in an urban scene. In a further example, a combination of the individual manner and the holistic manner may be used such as an image of an urban scene with a plurality of people but an individual person is focused, centered, and/or occupying a greater percentage of the area in the image. This individual person may have a significance score that is modified (e.g., increased) in light of the individual characteristics (e.g., a person) and holistic characteristics relative to the other objects in the image. The analysis engine 220 may evaluate the various objects in an image and assign a significance score (e.g., from 0 to 1) that is compared to a threshold score (e.g., 0.5). Based on this comparison, an identified object in the image that has a significance score that is greater than the threshold score may be labeled as foreground content while an identified object in the image that has a significance score that is less than the threshold score may be labeled as background content.

Figure 3:
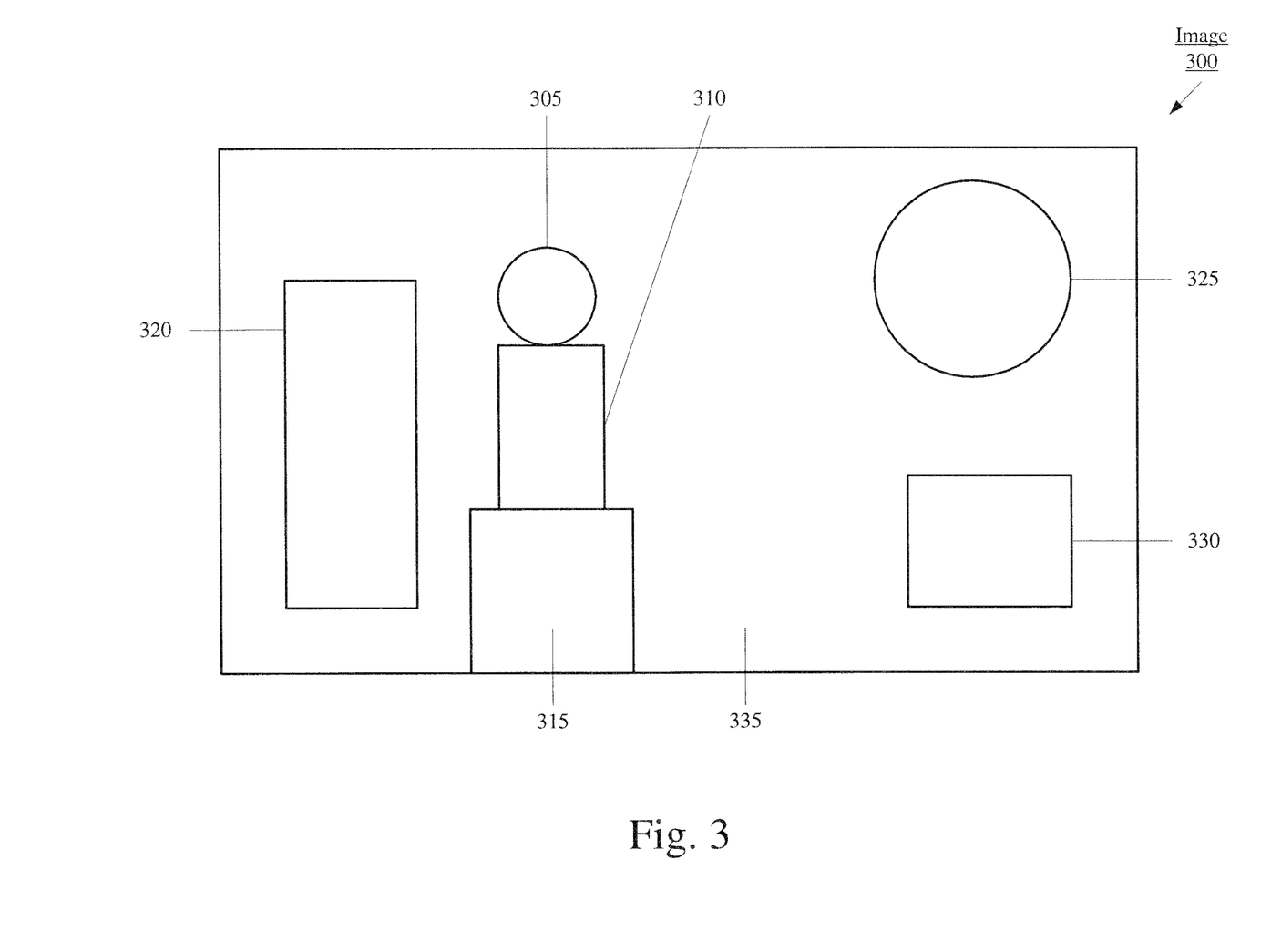
FIG. 3 shows an exemplary image that is processed according to various exemplary embodiments described herein.

FIG. 3 shows an exemplary image 300 that is processed according to various exemplary embodiments described herein. Specifically, the image 300 may include a plurality of objects. As illustrated, the image 300 may include a person including a face 305 and a body 310. The image 300 may have captured the person riding a vehicle 315 (e.g., a motorcycle). The image 300 may have also captured other objects such as a tree 320, the sun 325, a random object 330, etc. The remaining portion of the image 300 may be a background scene 335. The background scene 335 may also be identified as an object (e.g., a remaining object that was not individually identified by the analysis engine 220).

According to an exemplary embodiment, the analysis engine 220 may label each of the objects in the image 300. In a first example, the face 305 may be the only object in the image 300 that is labeled as foreground content. Accordingly, the other objects in the image 300 including the vehicle 315, the tree 320, the sun 325, the object 330, and the background scene 335 may be labeled as background content. Even the body 310 of the person may be labeled as background content. For example, the person may be wearing clothing which may be approximated without deviating to a substantial degree from the manner in which the body 310 was captured.

In another example, the other objects of the image 300 such as the body 310 may also be labeled as foreground content or background content based on the characteristics of the object as captured. In a first example, the body 310 may be labeled as foreground content when certain characteristics associated with the body 310 are different from the first example. For example, the person may have more skin exposed, have unique clothing that is incapable of being approximated to a sufficient degree, have identifying characteristics (e.g., tattoos) that are visible in the image 300, etc. When an object has a combination of characteristics that warrant labeling as foreground content where the significance score rises above the significance threshold, the labeling of the object may be modified. In a second example, the vehicle 315 may be labeled as foreground content when, for example, the vehicle 315 is personalized. For example, the vehicle 315 may include decals, other customized aesthetic characteristics, customized parts, etc. that raise the significance score above the significance threshold. In a third example, the vehicle 315 may include only stock parts and have a stock design that keep the significance score below the significance threshold. In a fourth example, unless the tree 320 had a particularly unique characteristic, the tree 320 may be labelled as a background content.

When the analysis engine 220 labels the objects in the image 300, the analysis engine 220 may also generate and associate further information of the object. Since the foreground objects are stored to maintain the object in a state as captured in the image 300, the analysis engine 220 may simply label the object as foreground content. The analysis engine 220 may also determine a location of the object labeled as foreground content within the image 300. The location may be a relative location within an area of the image 300 or a specific location in the image 300. For example, image location information may be stored for the face 305 as being positioned on a left half of the image 300 with a known distance (e.g., pixel count) from each edge. In another example, image location information may be stored to indicate the pixels that are being occupied in the image 300.

In contrast, as noted above, the background objects are stored as metadata that identify the object and other information that may be used to approximate the object when the image is being recreated. In a first example, the analysis engine 220 may identify the object. As noted above, the analysis engine 220 may utilize any mechanism to identify the presence of an object. The analysis engine 220 may further identify the object itself. For example, deep learning algorithms may be applied to identify objects from a model or a database of known objects. Accordingly, the analysis engine 220 may generate identification information of the object (e.g., a type of tree for the tree 320, a make and model of the vehicle 315, etc.). In a second example, the analysis engine 220 may determine a size of the object in the image 300. For example, the size of the object may be a percentage of the area of the image 300. In a third example, the analysis engine 220 may determine a perspective of the object. For example, an angle in which the object is captured in the image 300 may be determined. In a particular example, the vehicle 315 may be a motorcycle where a reference angle may be 0° when facing directly at a front of the motorcycle. The angle of the motorcycle as captured in the image 300 may be relative to this reference angle (e.g., an angular change in the roll, pitch, and/or yaw direction). In a fourth example, further information may be a time and location that the image 300 was captured. The time may allow for an approximation of certain objects. For example, a position and size of the sun 325 may be extrapolated from the time and location. In another example, the time and location as well as the position of the sun 325 may be used to determine shadows that may be created from the objects in the image 300. However, it is noted that the shadows of the objects may also be identified as objects themselves with corresponding information to be included for the background content. Identification of other light sources (e.g., a lamp in an indoor environment) may also be used as a source of information to determine shadow size and angles for objects. It is noted that shading and brightness level information may also be generated and stored for each object in the image 300. In a fifth example, a relative position of the objects in the image 300 labeled as background content may be stored in a substantially similar manner as the objects labeled as foreground content. In a sixth example, the background scene 335 may have additional information associated therewith that describes what is included or generally describes the scene (e.g., an outdoor park, a room of a house, etc.). Accordingly, the analysis engine 220 may generate and associate further information with the objects labeled as background content.

Once the objects in the image 300 have been identified and labeled with any further information being determined, the corresponding data to be included in image data may be generated. As noted above, the foreground engine 225 may generate foreground data for the foreground content which is to be included in image data for the image corresponding to the raw data. For example, the objects in the image 300 labeled as foreground content (e.g., face 305) may be converted into foreground data using any mechanism used to convert raw sensor data to data used in creating image data. In a particular example, the objects labeled as foreground content may be converted in a manner corresponding to generating image data for an entire image as performed conventionally, except for only the portions of the image 300 that are foreground content. The background engine 230 may generate metadata representative of the background content which is to be included in the image data for the image corresponding to the raw data. In one manner, the metadata describes what has been removed from the image data. The metadata may be generated to include various pieces of information (e.g., identity of object, location of object in the image 300, color of object, etc.). However, the metadata for each object that is labelled as background content is used to indicate the various types of information indicated above and not the corresponding image data itself. Accordingly, the metadata for the background content may utilize a significantly smaller amount of data than if the objects of the background content were converted to image data as was performed for the objects of the foreground content.

The data storage engine 235 may generate the image data in a proper format to be stored in the image storage device 120. For example, the data storage engine 235 may receive the outputs from the foreground engine 225 and the background engine 230 to create the image data for the image 300 by combining the foreground data and the metadata for the background content into the appropriate format. In a particular implementation, the image data for the image 300 may include the foreground data and replace the objects of the background content as empty image information (e.g., white or black) while further including the metadata for the background content. Those skilled in the art will understand that empty image information or data may be blanked portions of the image data for the image 300 serving as placeholders for subsequent use (as will be described in further detail below). As empty image information or data being blanked portions represented in a monotone (e.g., white or black), the amount of data that is required may be significantly less than standard image data that would be used for the background content. It is noted that empty data may not entail an absence of any data. Rather, the empty data may include certain information to represent the blanked portion as a monotone (e.g., a particular pixel is the monotone color). In a first example, the empty data may be mapped to white which compresses relatively well due to the capability of being run-length-encoded (e.g., an RGB pixel value of 000000h with the number of pixels with that value for a given row). In a second example, the empty data may utilize non-exhausted based encodings (e.g., non-row-based) which enable the data to be omitted completely. The data storage engine 235 may also transmit the image data (e.g., via the transceiver 215) for storage of the image data in the image storage device 120. The data storage engine 235 may also assign a unique identification for the image data for subsequent retrieval purposes to be used in recreating the image 300.

As noted above, the compression server 115 may also be configured to recreate an image based on the image data including the foreground data for the foreground content and the metadata for the background content. For example, a user associated with the sensor 105 may request the image. Accordingly, the engines of the compression server 115 may provide the features of the second mechanism according to the exemplary embodiments in which an image is recreated based on image data corresponding to a requested image. For example, the request may include an identification of the image data. In providing this feature, the compression server 115 may include a recreation engine 240. The system 100 may include, for example, further components such as a desktop terminal, a wireless display device, etc. that may be used to request an image.

The recreation engine 240 may receive the request to recreate the image. Upon determining an identity of the image and the corresponding image data, the recreation engine 240 may request the image storage device 120 for the image data. The recreation engine 240 may then determine the foreground data for the foreground content and the metadata for the background content.

As noted above, the foreground data may include image data for the objects labeled as foreground content and a location in the image 300. Based on this information and data, the recreation engine 240 may recreate the foreground objects. Those skilled in the art will understand the various mechanisms that may be used in recreating an entire image based on image data. According to the exemplary embodiments, a substantially similar operation may be used in recreating the foreground objects with the additional location information (e.g. pixel occupancy) indicating where the foreground objects are to be recreated for the image 300.

The metadata for the background content may identify the objects labeled as background content and a location for each of these objects in the image 300. The recreation engine 240 may approximate the objects as the background content using various sources of information based on the further information included for each of the objects labeled as background content and included in the metadata. Returning to the system 100 of FIG. 1, the system 100 may further include a restoration library 125. The restoration library 125 may represent one or more sources from which an approximation of an object may be generated. For example, the restoration library 125 may include a library of known objects, a physics model, other approximation models, etc. The library of known objects may include man-made things (e.g., buildings, roads, etc.), natural things (e.g., organic and inorganic features), people (e.g., known or parameterized), animals, etc. Using the restoration library 125 and based on the information included in the metadata for each object labeled as background content, the recreation engine 240 may approximate the background objects to be included in the image 300 along with the foreground objects which were recreated as was captured. It is noted that the restoration library 125 is illustrated as a network component as a further description of the exemplary embodiment where the compression server 125 is a network component. However, the restoration library 125 may be incorporated in the compression server 125. The restoration library 125 may also be incorporated in the sensor 105 or the requesting device requesting the image (e.g., if the recreation engine 240 is incorporated therein).

In a specific example with further details of the image 300, the image 300 may include an unidentified person (e.g., having the face 305 and body 310) wearing jeans (e.g., having a known or unknown brand), a red sweater (e.g., having a known or unknown brand), white high-top sneakers (e.g., having a known or unknown brand), and a sports cap (e.g., having a known or unknown team) riding the vehicle 315 (e.g., a motorcycle having a known make and model) along a shoulder lane of a known road. The image of the person's face 305 may have been stored as foreground data while the remaining areas of the image 300 are stored as blank image information. The remaining areas of the image 300 may have been described as metadata for the background content. For example, the license plate of the vehicle 315, the vehicle 315, the clothing on the body 310, a location, a speed, the road, etc. may all be parameterized and fit to the relative position and orientation within the image 300. In a particular implementation, for a license plate in the United States, the state/territory/location of the license plate may be stored as a number from 1 to 52 (with additional numbers being used for further types of license plates including government plates) that describe an exemplary license plate template along with a corresponding ASCII plate number. This may further reduce an image of a license plate significantly (e.g., to approximately 12 bytes) while retaining the ability to be usefully recreated using the mechanism according to the exemplary embodiments. For each of the objects labeled as background content, the metadata may include the size, shape, location, etc. in the image 300 for the approximation operation to be performed by the recreation engine 240 such that the image 300 is recreated. With the face 305 being stored as captured in the foreground data, an identification of the person may still be achieved. For example, for an application of this image recreation for policing purposes, the image may allow a police officer to identify the person.

In approximating the objects of the background content, the recreation engine 240 may utilize any operation and use any of the sources of the restoration library 125. In a first example, the tree 320 may be approximated. The metadata may include information for the tree 320 that describes this object. For example, the information may include the type of tree, a size of the tree, and a location of the tree in the image 300. The recreation engine 240 may access the library of objects to retrieve a generic image of the type of tree, adjust the size of the tree to match the size as defined in the metadata and generate the approximation for placement at the proper location in the image 300. In a second example, the vehicle 315 may be approximated. The metadata may include information for the vehicle that describes this object. For example, the information may include the make and model of the vehicle 315, an angle at which the vehicle 315 is captured in the image 300, a size of the vehicle 315, and a location of the vehicle in the image 300. The recreation engine 240 may access the library of objects to retrieve a generic image of the vehicle 315. Using a physics model, the generic image of the vehicle 315 may be modified based on the angle at which the vehicle 315 was captured. The physics model may also resize the vehicle 315 to match the size defined in the metadata. The approximation for the vehicle 315 may be generated and placed at the proper location in the image 300. In a third example, the sun 325 may be approximated. The metadata may include information about where and when the image 300 was captured. Based on time and location, the recreation engine 240 may access weather or other information for the sun 325 to be approximated and placed at the proper location in the image 300. The above approximation operations may be performed for the objects labeled as background content.

It is noted that the background scene 335 may be approximated in a substantially similar manner. For example, the metadata may include a general description of the scene included in the background scene 335. Accordingly, the recreation engine 240 may retrieve a generic scene from the library of objects to approximate how the background scene 335 is to be included in the image 300 with the other objects labeled as background content and objects labeled as foreground content occluding the generic scene at the respective locations thereof. The generic scene may utilize the location information and any perspective information to approximate the scene to be used in recreating the image 300. In a particular example, based on the location information, if the background is an urban scene such as a streetscape, any available street view at the known location at the known time may be used and modified (e.g., based on the perspective of the streetscape captured in the image 300). In other examples of recreating the background scene 335, the background scene 335 may be identified as the sky. The location and time information may be used to identify the weather at this location at this time. Accordingly, the background scene 335 may be approximated with a generic view of the sky corresponding to the identified weather. If the background scene 335 may be of other types of scenes (e.g., a grass field, a forest, a train station or track, a beach, etc.), a respective approximation may be generated based on a substantially similar operation as described above for the relatively low significance scene.

In utilizing the above described manner according to the exemplary embodiments, an image may be stored with image data including foreground data for objects labeled as foreground content occupying first portions of an image, empty data for remaining portions of the image, and metadata representing objects labeled as background content that occupy the remaining portions upon being parameterized. By identifying objects and defining whether the object is background content or foreground content, the exemplary embodiments may create the image data to use substantially less data. As a greater percentage of the amount of pixels in the image occupy background content, the amount of data required to store the image data decreases. The image may be subsequently recreated substantially similar to the image being captured. With the foreground data allowing the objects labeled as foreground content to be recreated as was captured and metadata identifying the various objects labeled as background content along with access to a restoration library to approximate the background objects, the entire image may be recreated in a substantially similar manner as the image was originally captured with objects having a relatively high significance being shown as captured while objects having a relatively low significance being approximated for a representation of the objects as captured.

It is noted that the exemplary embodiments are described above with regard to an image or a single frame. However, the use of an image is only exemplary. The exemplary embodiments may also be implemented for video or a sequence of images. For example, because each frame of the video is an individual image, each frame of the video may be processed according to the exemplary embodiments. However, the video may also take advantage of the processing operations of the exemplary embodiments as the sequence of frames in the video may have objects that are present in adjacent frames. Thus, with regard to the first aspect of generating image or video data, parameters that are determined including identified objects, determined labels, perspective information, date, time, location, etc., may be shared between adjacent frames to improve processing of the frames into video data (including foreground video data, empty video data, and metadata for background content). In the same manner that an individual image file may be stored with image data that uses a significantly lesser amount of data, the video file including the video data may also be stored with less data.

With regard to the second aspect of recreating the video, the exemplary embodiments may also improve the manner in which the frames are transmitted. As those skilled in the art will understand, a video transmission from a source to a destination may be configured with features to reduce a bandwidth that is required for the data to be transmitted by reducing an amount of data to be transmitted. For example, a JPEG video transmission may entail transmitting an initial frame in its entirety and each subsequent frame is transmitted through a representation of changes from a previous frame. In this manner, each frame after the initial frame may only utilize a fraction of an amount of data than if the entire frame would be transmitted (e.g., since only the changes are transmitted). Each frame in a video as stored in video data according to the exemplary embodiments may further improve this video transmission mechanism. For example, with an initial frame being an initial image, the initial image may be transmitted with the corresponding image data that is stored as foreground data and metadata. Each subsequent frame or image may be transmitted as changes relative to a previous frame. Accordingly, the exemplary embodiments may enable even less bandwidth requirements to transmit a video, particularly for the initial frame.

The exemplary embodiments may also provide further features with regard to image storage and recreation. As each object is identified, labeled, parameterized, etc. according to the exemplary embodiments, the various objects may also be manipulated to perform these further features. For example, an object may be moved from one context to another by modifying the parameters and recreating the image with the modified parameters. As noted above, the restoration library 125 may provide access to models and a library of objects. Accordingly, a further feature that may be provided through the mechanisms according to the exemplary embodiments may entail placing an object in an image with a modification using, for example, the models. Another example may entail placing an object in a different scene. Therefore, the exemplary embodiments may provide the compression feature described above as well as other use cases (e.g., scene simulation, augmentation, virtual reality, etc.). Deep learning segmentation techniques may additionally enable a replacement of select screens with a pure software solution to allow an improved manner for media use cases (e.g., commercials, live streams, movies, etc.).

Figure 4:
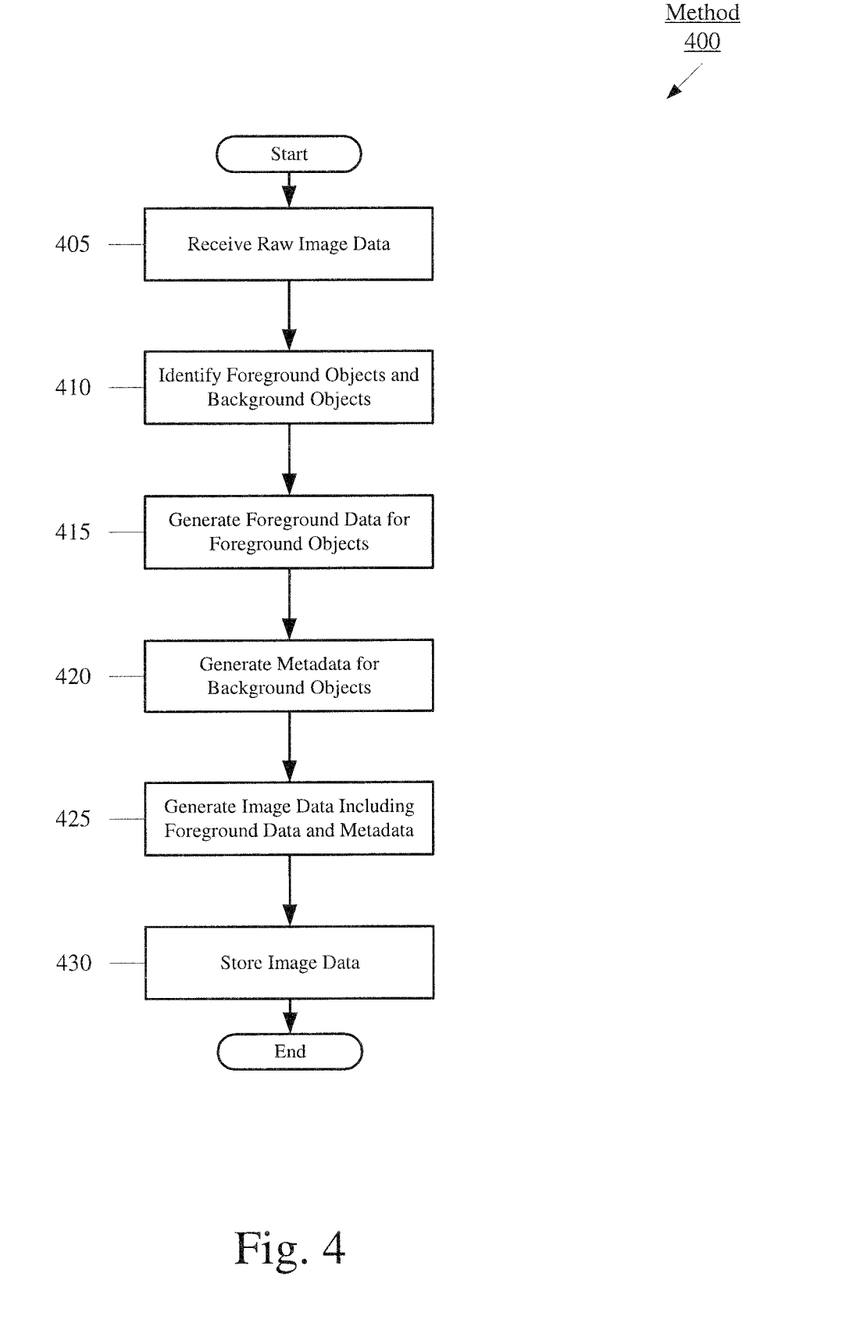
FIG. 4 shows an exemplary method to process and store an image according to various exemplary embodiments described herein.

FIG. 4 shows an exemplary method 400 to process and store an image according to various exemplary embodiments described herein. Specifically, the compression server 115 may generate image data including foreground data representing a first portion of an image including objects labeled as foreground content and metadata representing a second portion of the image including objects labeled as background content. The method 500 may be performed by the compression server 115 and generate the image data based on raw data received from the sensor 105. The method 500 will be described with regard to the system 100 of FIG. 1, the compression server 115 of FIG. 2, and the image 300 of FIG. 3.

In 405, the compression server 115 receives raw image data corresponding to a captured image from the sensor 105. The raw image data may be sensor data as captured by the sensor 105 under predetermined settings on the sensor 105 (e.g., quality, pixel density, etc.). The raw image data may be transmitted from the sensor 105 to the compression server 115 over the communications network 110.

In 410, the compression server 115 processes the raw image data to identify the objects that are included in the image. The various objects may initially be detected using deep learning algorithms and other recognition operations. Upon detecting the objects, the compression server 115 may determine a significance score for each object in an individual and/or holistic manner. Based on the significance score and a significance threshold, the compression server 115 may label each object as pertaining to foreground content or background content. A remaining portion of the image that was not identified as an object may be considered a background scene, which itself may be an object that pertains to background content.

In identifying the foreground objects, the compression server 115 may also determine a relative position of the foreground object within the image. For example, a pixel occupancy of the foreground object may be determined. In identifying the background objects, the compression server 115 may further determine an identity of the background objects (e.g., person, inanimate object, natural object, etc.). Based on various identification and further recognition operations, the compression server 115 may be configured to determine an identity of each background object. The compression server 115 may further determine a relative position of the background object within the image in a manner substantially similar to the foreground objects. The compression server 115 may additionally determine further information, characteristics, or parameters associated with each of the respective background objects. For example, a perspective of the object relative to a base angle may be determined. In another example, a coloring, shading, brightness, etc. of the object may be determined. The compression server 115 may also determine the time and location that the image was captured. Those skilled in the art will understand the various ways that the time and location of the image being captured is determined (e.g., a time stamp, GPS coordinates, etc.).

In 415, the compression server 115 may generate foreground data for the foreground objects. The foreground data may include image data for each foreground object as well as further information relating to a relative position of the foreground object in the overall image. The compression server 115 may further generate empty image data for all remaining areas of the image that is not occupied by the foreground objects.

In 420, the compression server 115 may generate metadata for the background objects. The metadata may include an identity of each background object, a relative position of the background object in the overall image, further information of the background object, etc. The metadata may also include information of the image such as a time and a location that the image was captured by the sensor 105.

In 425, the compression server 115 generates image data for the image including the foreground data and the metadata. The compression server 115 may format the image data for the image in an appropriate way such that, in 430, the compression server 115 transmits the image data to an image storage device 120 to store the image data.

Figure 5:
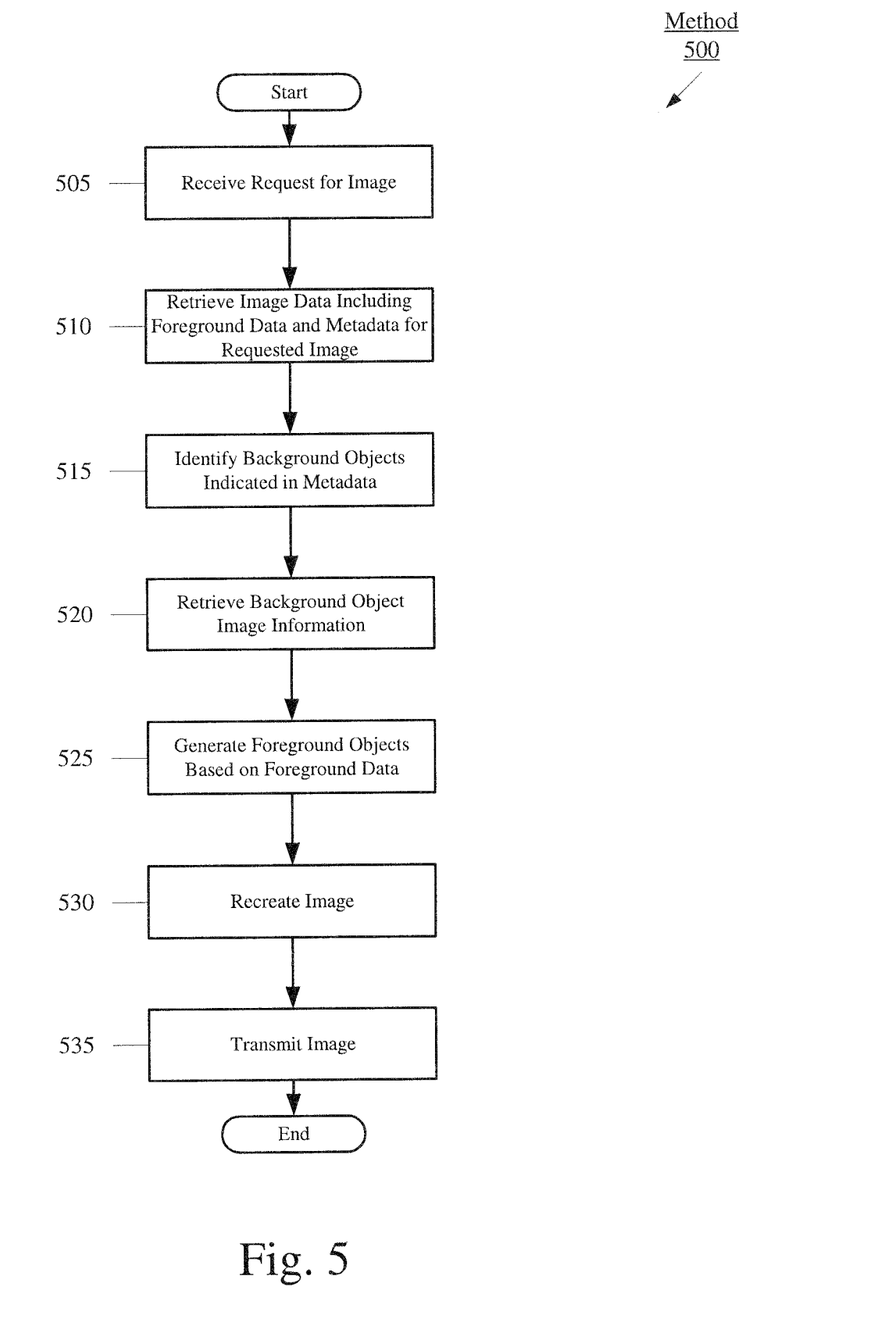
FIG. 5 shows an exemplary method to recreate an image according to various exemplary embodiments described herein.

FIG. 5 shows an exemplary method 500 to recreate an image according to various exemplary embodiments described herein. Specifically, the compression server 115 may utilize image data including foreground data to recreate a first portion of an image for objects labeled as foreground content and metadata to recreate a second portion of the image via approximation from other information of objects labeled as background content. The method 500 may be performed by the compression server 115 and provide an image to a requesting device. The method 500 will be described with regard to the system 100 of FIG. 1, the compression server 115 of FIG. 2, and the image 300 of FIG. 3.

In 505, the compression server 115 receives a request for an image. As noted above, when the compression server 115 generates image data, an identifier may be associated with the image. The identifier may be used in the request for the image.

In 510, the compression server 115 retrieves the image data corresponding to the requested image from the image storage device 120. The image data may include foreground data for each foreground object in the image and metadata indicating information for the image and each background object in the image.

In 515, the compression server 115 identifies the background objects included in the metadata. In 520, the compression server 115 retrieves the image information for the background object. Using this information, the compression server 115 is capable of approximating each of the background objects by accessing the restoration library 125 and the features/functionalities that are available. For example, a background object identity may allow for a generic object to be retrieved. The generic object may be modified based on the image information for the image and the background object. In a particular example, a perspective of the background object may be indicated and the generic object may be rotated accordingly. By performing an approximation for each background object and based on relative position information within the image, the background content of the image may be approximated and recreated.

In 525, the compression server 115 generates the foreground objects based on the foreground data which includes image data for each of the foreground objects. The foreground objects may be recreated using any mechanism by which image data is used to create an image or a portion thereof. Relative position information may also be used to determine where the foreground objects are to be placed in the image.

In 530, the compression server 115 recreates the image by combining the background content and the foreground content. In 535, the compression server 115 transmits the image to the requesting entity or device.

The exemplary embodiments provide a device, system, and method of improving compression of image data by leveraging image-processing techniques to identify foreground content and background content in an image. By maintaining objects in foreground content as captured and representing objects in background content in metadata that is descriptive of the background objects, the resulting image data may use empty data for the background content and replace what would be image data with the metadata. In this manner, the exemplary embodiments may improve multimedia storage and transmission without a significant quality decrease. Recreation of the image may also be performed with less requirements as a restoration library may provide data to be used in approximating the background objects to be included in the recreated image.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a compression server:
   receiving raw image data of an image;
   identifying objects in the image as one of a foreground object or a background object;
   generating first foreground image data for a first foreground object;
   storing the first foreground image data that retains a quality of the first foreground object;
   generating first metadata for a first background object wherein the first background object of the image is stored as only the first metadata, the first metadata comprising a first identity that is an identity of the first background object, and a first descriptive parameter for the first background object, the first descriptive parameter relating to how the first background object is situated in the image; and
   storing processed image data for the image comprising the first foreground image data and the first metadata, wherein the first metadata allows the compression server to retrieve image data approximating the first background object from a data source.

2. The method of claim 1, wherein the first metadata further indicates image information associated with the image.

3. The method of claim 2, wherein the image information includes a time and a location at which the image was captured.

4. The method of claim 1, wherein the first descriptive parameter indicates one of a perspective of the background object, a coloring of the background object, a shading of the background object, a brightness of the background object, a size of the background object, or a combination thereof.

5. The method of claim 1, wherein the first foreground image data and the first metadata indicate a relative position of the first foreground object and the first background object, respectively, in the image.

6. The method of claim 1, wherein the identifying of the objects as one of the foreground object or the background object comprises:

determining a significance score for each of the objects;
labeling the objects having the significance score greater than a significance threshold as the foreground object; and
labeling the objects having the significance score less than the significance threshold as the background object.

7. The method of claim 6, wherein the significance score is based on one of an individual capacity, a holistic capacity, or a combination thereof.

8. The method of claim 1, further comprising: receiving a request to recreate the image based on the processed image data;
recreating the first foreground object using the first foreground image data;
approximating the first background object using the first metadata; and
recreating the image to include the first foreground object and the first background object.

9. The method of claim 8, wherein the approximating the first background object using the first metadata comprises:
retrieving an approximation image based on the first identity of the first background object; and
modifying the approximation image based on the first descriptive parameter.

10. The method of claim 1, wherein the empty data converts the background object to a monotone.

11. A compression server, comprising:
a transceiver configured to receive a raw image data of an image; and
a processor configured to identify objects in the image as one of a foreground object or a background object, the processor configured to generate first foreground image data for a first foreground object and store the first foreground image data in a memory that retains a quality of the first foreground object, the processor configured to generate first metadata for a first background object wherein the first background object of the image is stored only as the first metadata, the first metadata comprising a first identity that is an identity of the first background object, and a first descriptive parameter for the first background object, the first descriptive parameter relating to how the first background object is situated in the image,
wherein stored processed image data for the image comprises the first foreground image data and the first metadata, wherein the first metadata allows the compression server to retrieve image data approximating the first background object from a data source.

12. The compression server of claim 11, wherein the first metadata further indicates image information associated with the image.

13. The compression server of claim 12, wherein the image information includes a time and a location at which the image was captured.

14. The compression server of claim 11, wherein the first descriptive parameter indicates one of a perspective of the background object, a coloring of the background object, a shading of the background object, a brightness of the background object, a size of the background object, or a combination thereof.

15. The compression server of claim 11, wherein the first foreground image data and the first metadata indicate a relative position of the first foreground object and the first background object, respectively, in the image.

16. The compression server of claim 11, wherein the processor identifies the objects as one of the foreground object or the background object by:
determining a significance score for each of the objects;
labeling the objects having the significance score greater than a significance threshold as the foreground object; and
labeling the objects having the significance score less than the significance threshold as the background object.

17. The compression server of claim 16, wherein the significance score is based on one of an individual capacity, a holistic capacity, or a combination thereof.

18. The compression server of claim 12, wherein the transceiver is configured to receive a request to recreate the image based on the processed image data, and wherein the processor recreates the first foreground object using the first foreground image data, the processor approximates the first background object using the first metadata, and the processor recreates the image to include the first foreground object and the first background object.

19. The compression server of claim 18, wherein the processor approximates the first background object using the first metadata by:
retrieving an approximation image based on the first identity of the first background object; and
modifying the approximation image based on the first descriptive parameter.

20. A method, comprising:
at a compression server:
receiving a request to recreate an image based on processed image data, the processed image data including foreground image data and metadata representing background image data, wherein the processed image data is assigned a unique identification for subsequent retrieval in recreating the image, the foreground image data corresponding to an identified foreground object that is stored in a memory and retains a quality of the first foreground object, the metadata comprising an identity for an identified background object and a descriptive parameter for the identified background object relating to how the identified background object is situated in the image;
retrieving background image data approximating the first background object from a data source based on the metadata;
recreating the identified foreground object using the foreground image data; and
recreating the image based on the background image data and the foreground image data.

* * * * *